(12) United States Patent
Tewfik et al.

(10) Patent No.: US 8,155,375 B2
(45) Date of Patent: *Apr. 10, 2012

(54) VIDEO WATERMARKING USING TEMPORAL ANALYSIS

(75) Inventors: Ahmed Tewfik, Edina, MN (US); Bin Zhu, Beijing (CN); Mitch Swanson, Eden Prairie, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 1081 days.

This patent is subject to a terminal disclaimer.

(21) Appl. No.: 11/928,300

(22) Filed: Oct. 30, 2007

(65) Prior Publication Data

US 2008/0226120 A1    Sep. 18, 2008

Related U.S. Application Data

(63) Continuation-in-part of application No. 10/360,794, filed on Apr. 30, 2001, now Pat. No. 7,366,908, which is a continuation-in-part of application No. 08/921,931, filed on Aug. 27, 1997, now Pat. No. 6,226,387, and a continuation-in-part of application No. 08/918,126, filed on Aug. 27, 1997, now Pat. No. 6,272,634, and a continuation-in-part of application No. 08/918,125, filed on Aug. 27, 1997, now Pat. No. 6,282,299.

(60) Provisional application No. 60/050,587, filed on Jun. 24, 1997.

(51) Int. Cl.
*H04K 1/00* (2006.01)

(52) U.S. Cl. ........................ 382/100; 348/461

(58) Field of Classification Search .................. 382/100, 382/232; 348/461, 463, 465, 467; 380/218, 380/287, 54; 713/176
See application file for complete search history.

(56) References Cited

U.S. PATENT DOCUMENTS

| | | | |
|---|---|---|---|
| 4,237,484 A | 12/1980 | Brown et al. | 358/142 |
| 4,939,515 A | 7/1990 | Adelson | 341/51 |
| 5,010,405 A | 4/1991 | Schreiber et al. | 358/141 |
| 5,636,292 A | 6/1997 | Rhoads | 382/232 |
| 5,663,766 A | 9/1997 | Sizer, II | 348/473 |
| 5,809,139 A | 9/1998 | Girod et al. | 380/5 |
| 5,809,160 A | 9/1998 | Powell et al. | 382/100 |

(Continued)

FOREIGN PATENT DOCUMENTS

JP    05-236424 A    8/1993

OTHER PUBLICATIONS

Ohnishi et al., "Embedding a Seal into a Picture under Orthogonal Wavelet Transform", IEEE Proc. $3^{rd}$ Int. Conf. on Multimedia Computing and Systems, Jun. 1996, pp. 514-521.*

(Continued)

*Primary Examiner* — Andrew W Johns

(57) ABSTRACT

Methods of embedding and detecting watermarks in video use temporal analysis to compute temporal components of video from which the watermarks are embedded and detected. Temporal analysis, such as a temporal wavelet, is used to compute representations of static and dynamic portions of the video. For embedding, watermarks are computed from and/or adapted to the temporal components. For detecting, temporal properties are exploited to detect watermarks in the static and/or dynamic components. Temporal analysis also enables plural watermarks to be embedded at different levels of temporal resolution.

20 Claims, 5 Drawing Sheets

U.S. PATENT DOCUMENTS

| | | | | |
|---|---|---|---|---|
| 5,901,178 | A | 5/1999 | Lee et al. | 375/240 |
| 5,905,819 | A * | 5/1999 | Daly | 382/284 |
| 5,915,027 | A * | 6/1999 | Cox et al. | 380/54 |
| 5,930,369 | A * | 7/1999 | Cox et al. | 380/54 |
| 5,960,081 | A | 9/1999 | Vynne et al. | 380/10 |
| 6,131,161 | A | 10/2000 | Linnartz | 713/176 |
| 6,181,802 | B1 | 1/2001 | Todd | 382/100 |
| 6,226,387 | B1 * | 5/2001 | Tewfik et al. | 382/100 |
| 6,282,299 | B1 | 8/2001 | Tewfik et al. | 382/100 |
| 6,400,827 | B1 | 6/2002 | Rhoads | 382/100 |

OTHER PUBLICATIONS

Bender, "Techniques for Data Hiding," SPIE vol. 2420, pp. 164-173, 1995, SPIE vol. 2420, pp. 164-173.

Matsui, K., et al., "Video-Steganography: How to Secretly Embed a Signature in a Picture", IMA Intellectual Property Project Proceedings, vol. 1, 187-206 (Jan. 1994).

Hartung, et al. "Digital Watermarking of Raw and Compressed Video," Proc. SPIE 2952, Digital Compression Technologies and Systems for Video Communications, Oct. 1996, pp. 205-213.

J. Nam and A. H. Tewfik, "Combined Audio and Visual Streams Analysis for Video Sequence Segmentation," in Proceedings of the 1997 International Conference on Acoustics, Speech and Signal Processing, (Munich, Germany), pp. 2665-2668 (Apr. 1997).

Chang, S.-F., "Compressed-Domain Techniques for Image/Video Indexing and Manipulation", Proceeding for the 1995 IEEE International Conference on Image Processing, vol. 1, Washington, D.C., 314-317 (Oct. 23-26, 1995).

Chang, S.-F., et al., "Transform Coding of Arbitrarily-Shaped Image Segments", Proceedings of the ACM, Multimedia 93, Anaheim, CA, 83-90 (Aug. 1-6, 1993).

Cox, "A Secure, Imperceptable Yet Perceptually Salient, Spread Spectrum Watermark for Multimedia," IEEE, Southcon/96, Conference Record, pp. 192-197.

Goffin, "A Low Cost Perceptive Digital Picture Watermarking Method" Jan. 1, 1997.

English translation of JP 05-236424 (publ. Aug. 1993).

* cited by examiner

VIDEO WATERMARKING USING TEMPORAL ANALYSIS

RELATED APPLICATION DATA

This application is a continuation in part of U.S. patent application Ser. No. 10/360,794, filed Apr. 30, 2001, (now U.S. Pat. No. 7,366,908), which is a continuation-in-part of application Ser. No. 08/921,931, filed Aug. 27, 1997 (now U.S. Pat. No. 6,226,387), which claims priority to provisional application 60/050,587, filed Jun. 24, 1997.

U.S. patent application Ser. No. 10/360,794 is also a continuation-in-part of application Ser. No. 08/918,126, filed Aug. 27, 1997 (now U.S. Pat. No. 6,272,634), which claims priority to provisional application 60/050,587, filed Jun. 24, 1997.

U.S. patent application Ser. No. 10/360,794 is also a continuation-in-part of application Ser. No. 08/918,125, filed Aug. 27, 1997 (now U.S. Pat. No. 6,282,299), which claims priority to provisional application 60/050,587, filed Jun. 24, 1997.

The above applications and patents are incorporated by reference.

GOVERNMENT RIGHTS STATEMENT

The inventions detailed in this application was made with government support by AFOSR under grant AF/F49620-94-1-0461, NSF under grant NSF/INT-9406954 and ARPA GRANT No. AF/F49620-93-1-0558. The Government has certain rights in this invention.

FIELD OF THE INVENTION

This invention relates generally to techniques for embedding data such as watermarks, signatures and captions in digital data, and more particularly to video watermarking.

BACKGROUND OF THE INVENTION

Digital video is readily reproduced and distributed over information networks. However, these attractive properties lead to problems enforcing copyright protection. As a result, creators and distributors of digital video are hesitant to provide access to their digital intellectual property. Digital watermarking has been proposed as a means to identify the owner and distribution path of digital data. Digital watermarks address this issue by embedding owner identification directly into the digital data itself. The information is embedded by making small modifications to the pixels in each video frame. When the ownership of a video is in question, the information can be extracted to completely characterize the owner or distributor of the data.

Video watermarking introduces issues that generally do not have a counterpart in images and audio. Video signals are highly redundant by nature, with many frames visually similar to each other. Due to large amounts of data and inherent redundancy between frames, video signals are highly susceptible to pirate attacks, including frame averaging, frame dropping, interpolation, statistical analysis, etc. Many of these attacks may be accomplished with little damage to the video signal. A video watermark must handle such attacks. Furthermore, it should identify any image created from one or more frames in the video.

Furthermore, to be useful, a watermark must be perceptually invisible, statistically undetectable, robust to distortions applied to the host video, and able to resolve multiple ownership claims. Some watermarking techniques modify spatial/temporal data samples, while others modify transform coefficients. A particular problem afflicting all prior art techniques, however, is the resolution of rightful ownership of digital data when multiple ownership claims are made, i.e., the deadlock problem. Watermarking schemes that do not use the original data set to detect the watermark are most vulnerable to deadlock. A pirate simply adds his or her watermark to the watermarked data. It is then impossible to establish who watermarked the data first.

Watermarking procedures that require the original data set for watermark detection also suffer from deadlocks. In such schemes, a party other than the owner may counterfeit a watermark by "subtracting off" a second watermark from the publicly available data and claim the result to be his or her original. This second watermark allows the pirate to claim copyright ownership since he or she can show that both the publicly available data and the original of the rightful owner contain a copy of their counterfeit watermark.

There is a need, therefore, for watermarking procedures applicable to video digital data that do not suffer from the described shortcomings, disadvantages and problems.

SUMMARY OF THE INVENTION

One aspect of the invention is a method of embedding data in video. This method performs a temporal analysis of video to produce temporal components of the video and, provides watermark data to be embedded in the video. This watermark data is adapted to the temporal components and embed into the video signal.

Another aspect of the invention is a method of embedding data in video. This method transforms the video into plural levels of temporal resolution and provides watermark signals for separately embedding data in the plural levels of temporal resolution. The watermark signals are adapted to corresponding video at the plural levels of temporal resolution and embedded in the corresponding video at the plural levels of temporal resolution.

Another aspect of the invention is a method of detecting data embedded in video. This method receives video frames with data embedded into a temporal domain representation of the video frames. The temporal domain representation comprises changes of the video signal in the video frame over time. The method extracts a temporal component from video frames corresponding to the temporal domain representation, and detects a watermark in the temporal component.

Another aspect of the invention is a method of detecting data embedded in video. The method receives video frames with data embedded into video signals of the video frames that is computed from a temporal analysis of the video signals and combines the video frames to compute a temporal component of the video frames. The method detects a watermark in the temporal component.

In one embodiment, scenes are extracted from video host data that is made up of a number of successive frames. Each scene thus includes a number of frames. Each frame undergoes a wavelet transformation, which is then segmented into blocks. A frequency mask is applied to the corresponding frequency-domain blocks, which is then weighted with the author signature, also in the frequency domain. The resulting weighted block is taken out of the frequency domain, and then weighted with the spatial mask for its corresponding wavelet transformed block. A unique watermark generation routine is also described that assists in the resolution of deadlock.

This approach provides advantages over the approaches found in the prior art. In the prior art, an independent watermark applied to each frame may result in detection of the watermark by statistically comparing or averaging similar regions and objects in successive video frames, as has been described in the background. However, the scene-based approach addresses this issue by embedding a watermark this is a composite of static and dynamic components, the dynamic components preventing detection by statistical comparison across frames. Therefore, statistical comparison or averaging does not yield the watermark.

Further aspects, advantages and embodiments of the invention will become apparent by reference to the drawings, and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the invention. The following detailed description is, therefore, not to be taken in a limiting sense.

Overview of the Watermarking Process

Figure 1:
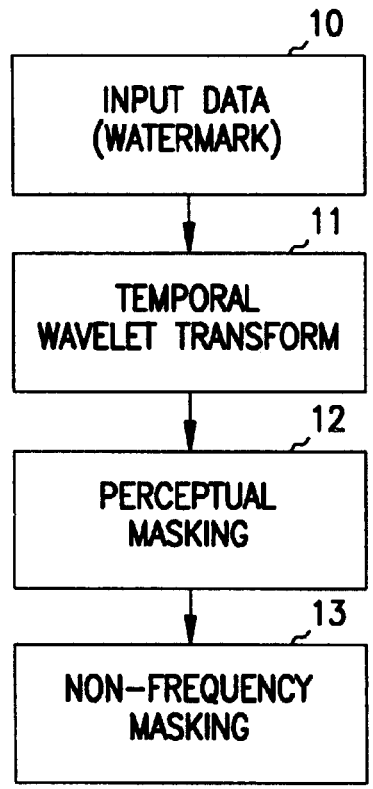
FIG. 1 is a flowchart of a method of a video watermarking process according to an embodiment.

Referring to FIG. 1, a flowchart of a method of a video watermarking process is shown. Specifically, the method of FIG. 1 imbeds watermark data into host video data. In step 10, the watermark data is generated, which is the signature, or watermark, that acts as a unique identifier for the host video data. Note that the signature inherently is spread across the frequency spectrum without explicit spread-spectrum processing.

In one embodiment, the signature is a pseudo-random sequence, which is created using a pseudo-random generator and two keys. With the two proper keys, the watermark may be extracted. Without the two keys, the data hidden in the video is statistically invisible and impossible to recover. Pseudo-random generators are well within the art. For example, the reference R. Rivest, "Cryptography," in Handbook of Theoretical Computer Science (J. van Leeuwen, ed.), vol. 1, ch. 13, pp. 717-755, Cambridge, Mass.: MIT Press, 1990, which is hereby incorporated by reference, describes such generators.

In one embodiment, the creation of the watermark data in step 10 works as follows. The author has two random keys x1 and x2 (i.e., seeds) from which the pseudo-random sequence y can be generated using a suitable cryptographic operator g(x1,x2), as known within the art. The noise-like sequence y, after some processing, is the actual watermark hidden into the video stream. The key x1 is author dependent. The key x2 is signal dependent. In particular, x1 is the secret key assigned to (or chosen by) the author. Key x2 is computed from the video signal which the author wishes to watermark. The signal dependent key is computed from the masking values of the original signal. The masking values give us tolerable error levels in the host video signal. The tolerable error levels are then hashed to a key x2.

The operator g( ) is called a pseudo-random sequence generator. For the pseudo-random generator to be useful, a pirate must not be able to predict bits of y or infer the keys x1 or x2 from knowledge of some bits of y. There are several popular generators that satisfy these properties, including RSA, Rabin, Blum/Micali, and Blum/Blum/Shub, as known within the art. For example, the Blum/Blum/Shub pseudo-random generator uses the one way function $y=g(x)=x*x$ mod n, where n=pq for primes p and q so that p=q=3mod4. It can be shown that generating x or y from partial knowledge of y is computationally infeasible for the Blum/Blum/Shub generator. The classical maximal length pseudo noise sequence (i.e., m-sequence) generated by linear feedback shift registers are not used for this purpose. Sequences generated by shift registers are cryptographically insecure, as one can solve for the feedback pattern (i.e., the keys) given a small number of output bits y.

Thus, a pirate is not free to subtract off a second watermark y' arbitrarily. The pirate must supply the keys x1' and x2' which generate the watermark y' they wish to embed. It is computationally infeasible to invert the one-way function y'=g(x1',x2') to obtain x1' and x2'. Furthermore, x2' is not arbitrary. It is computed directly from the original video signal, which is inaccessible to the pirate. As a result, the two-key pseudo-random sequence author representation resolves the deadlock problem.

In step 11, a wavelet transform is applied along the temporal axis of the video host data, resulting in a multiresolution temporal representation of the video. In particular, the representation consists of temporal lowpass frames and highpass frames. The lowpass frames consist of the static components in the video scene. The highpass frames capture the motion components and changing nature of the video sequence (i.e., the video host data). The watermark is designed and embedded in each of these components. The watermarks embedded in the lowpass frames exist throughout the entire video scene. The watermarks embedded in the motion frames are highly localized in time and change rapidly from frame to frame. Thus, the watermark is a composite of static and dynamic components. The combined representation overcomes drawbacks associated with a fixed or independent watermarking procedure. (I.e., avoidance of watermark detection by statistical comparison between successive frames is achieved.)

Figure 6:
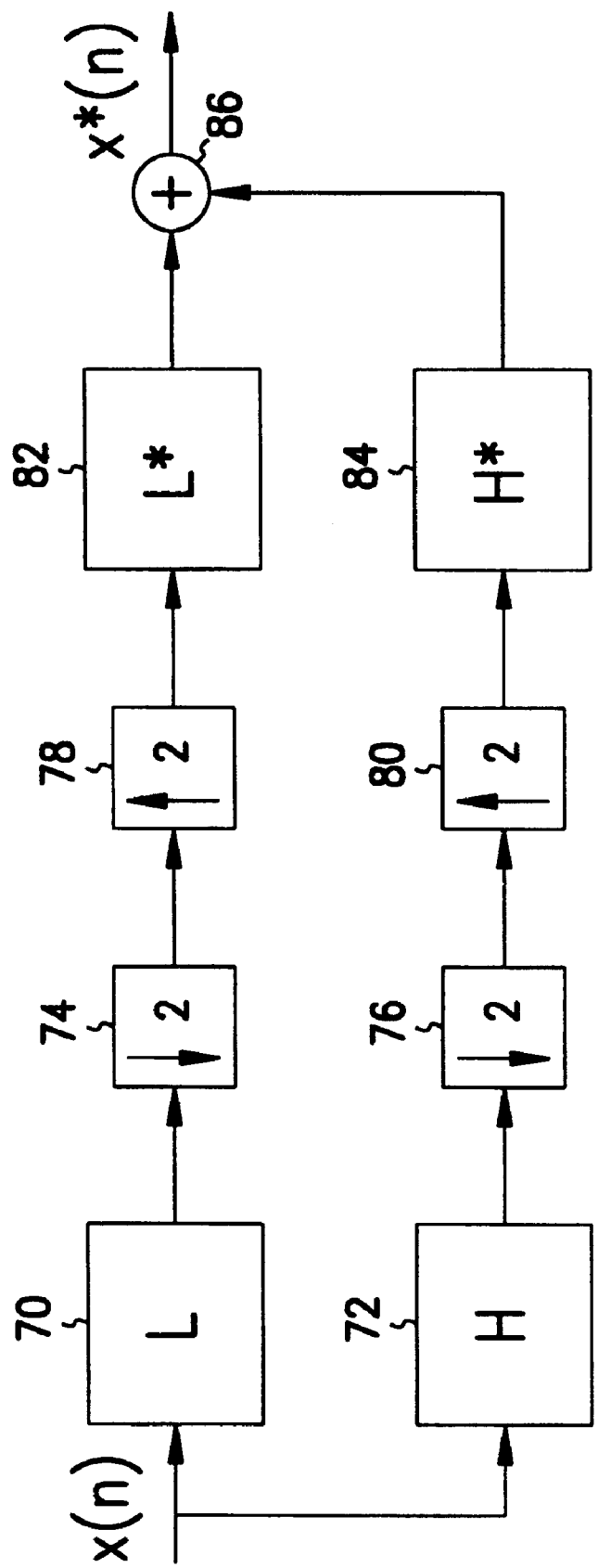

A wavelet transform can be computed using a two-band perfect reconstruction filter bank as shown in FIG. 6. The video signal is simultaneous passed through lowpass L filter 70 and highpass H filter 72 and then decimated by 2 (as represented by elements 74 and 76 of FIG. 6) to give static (no motion) and dynamic (motion) components of the original signal. The two decimated signals may be up sampled (as represented by elements 78 and 80), and then passed through complementary filters 82 and 84 and summed as represented by element 86 to reconstruct the original signals. Wavelet filters are widely available within the art. For instance, the reference P. P. Vaidyanathan, Multirate Systems and Filter Banks, Englewood Cliffs, N.J.: PTR Prentice-Hall, Inc., 1992, which is hereby incorporated by reference, describes such filters.

Referring back to FIG. 1, in step 12, the data generated by step 10 is imbedded into a perceptual mask of the host video data as represented by the temporal wavelet transform of step 11. One embodiment employs perceptual masking models to determine the optimal locations within host data in which to insert the watermark. The perceptual mask is specific to video host data. The mask provides for the watermark data generated by step 10 to be embedded with the host data, at places typically imperceptible to the human eye. That is, the perceptual mask exploits masking properties of the human visual system. Step 12 embeds the watermark within the temporally wavelet transformed host data such that they will not be perceived by a human eye, as defined by the perceptual model. The perceptual masking of step 12 is conducted in the frequency domain.

Thus, image masking models based on the human visual system (HVS) are used to ensure that the watermark embedded into each video frame is perceptually invisible and robust. Visual masking refers to a situation where a signal raises the visual threshold for other signals around it. Masking characteristics are used in high quality low bit rate coding algorithms to further reduce bit rates. The masking models presented here are based on image models.

Figure 5:
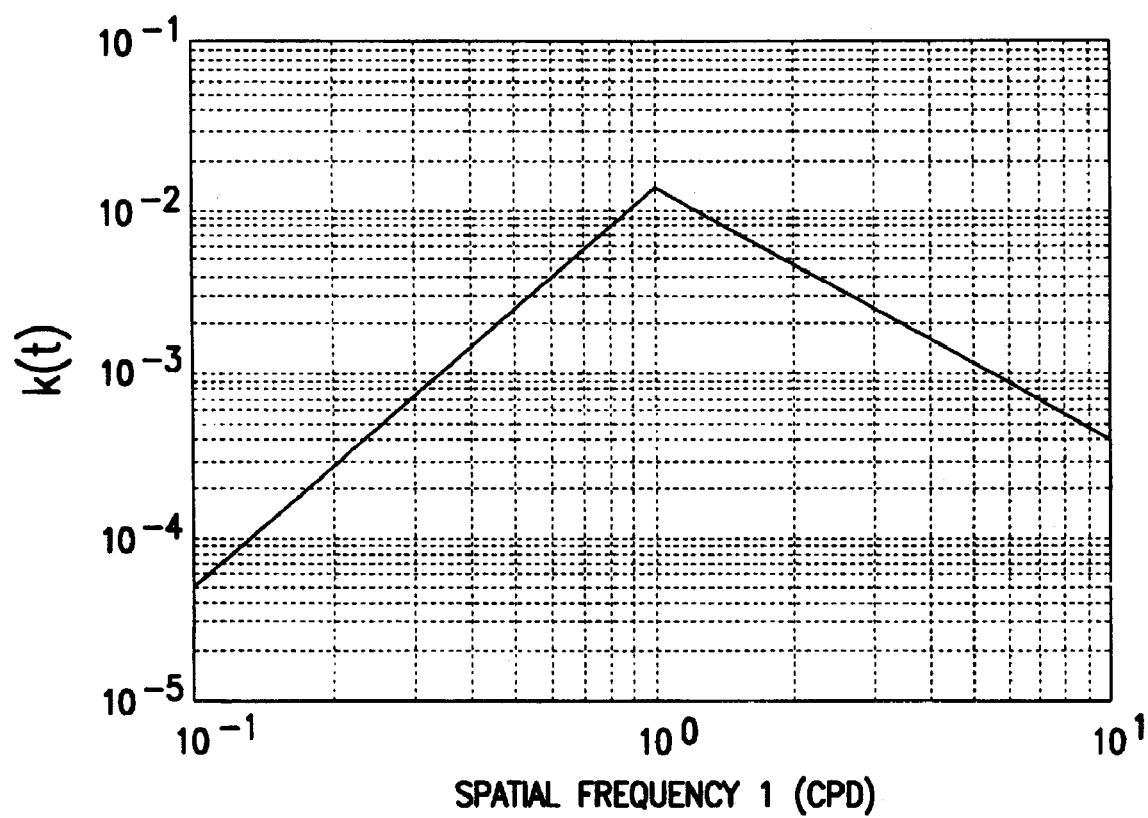
FIG. 5 is a diagram showing a masking weighting function k(f) according to one embodiment; and, FIG. 6 is a diagram showing a two-band perfect reconstruction filter in accordance with which a wavelet transform can be computed according to one embodiment.

The masking models give the perceptual tolerance for image coefficients and transform coefficients. These masking models are also described in the reference B. Zhu, et al., "Low Bit Rate Near-Transparent Image Coding," in Proc. of the SPIE Int'l Conf. on Wavelet Apps. for Dual Use, vol. 2491, (Orlando, Fla.), pp. 173-184, 1995, which is hereby incorporated by reference, and in the reference B. Zhu, et al., "Image Coding with Mixed Representations and Visual Masking," in Proc. 1995 IEEE Int'l Conf. on Acoustics, Speech and Signal Processing, (Detroit, Mich.), pp. 2327-2330, 1995, which is also hereby incorporated by reference. The frequency masking model is based on the knowledge that a masking grating raises the visual threshold for signal gratings around the masking frequency. The model is based on the discrete cosine transform (DCT), expresses the contrast threshold at frequency f as a function of f, the masking frequency fm and the masking contrast cm:

$$c(f, f_m) = c_o(f) \cdot \mathrm{Max}\{1, [k(f/f_m)c_m]^\alpha\},$$

where co(f) is the detection threshold at frequency f. The mask weighting function k(f) is shown in FIG. 5. To find the contrast threshold c(f) at a frequency f in an image, the DCT is first used to transform the image into the frequency domain and find the contrast at each frequency. The value .alpha.=0.62 as determined experimentally by psychovisual tests, and as described in G. E. Legge and J. M. Foley, "Contrast Masking in Human Vision," Journal Optics Society of America, vol. 70, no. 12, pp. 1458-1471 (1980), which is hereby incorporated by reference. Then, a summation rule of the form $$c(f) = [\Sigma f_m c(f, f_m)]^{1/\beta},$$

is used to sum up the masking effects from all the masking signals near f. If the contrast error at f is less than c(f), the model predicts that the error is invisible to human eyes.

In step 14, the host video data as subjected to a temporal wavelet transform in step 11, with the embedded watermark data from step 12 is further subjected to a non-frequency mask. Because the perceptual mask in step 12 is a frequency domain mask, a further mask is necessary to ensure that the embedded data remains invisible in the host video data. The non-frequency mask is a spatial mask.

Frequency masking effects are localized in the frequency domain, while spatial masking effects are localized in the spatial domain. Spatial masking refers to the situation that an edge raises the perceptual threshold around it. Any model for spatial masking can be used, and such models are well known in the art. However, the model used in one embodiment is similar to the model described in the Zhu, "Low Bit Rate . . . " reference previously incorporated by referenced, and which is itself based on a model proposed by Girod in "The Information Theoretical Significance of Spatial and Temporal Masking in Video Signals," in Proceedings of the SPIE Human Vision, Visual Processing, and Digital Display, vol. 1077, pp. 178-187 (1989), which is also herein incorporated by reference.

In one embodiment, the upper channel of Girod's model is linearized under the assumption of small perceptual errors, the model giving the tolerable error level for each pixel in the image, as those skilled in the art can appreciate. Furthermore, under certain simplifying assumptions described in the Zhu "Bit Rate . . . " reference, the tolerable error level for a pixel p(x,y) can be obtained by first computing the contrast saturation at (x,y)

$$dc_{sat}(x, y) = dc_{sat} = \sqrt{\frac{T}{\sum_{x',y'} w_4(0, 0, x', y')}}$$

where the weight $w_4(x,y,x',y')$ is a Gaussian centered at the point (x,y) and T is a visual test based threshold. Once $dc_{sat}$ (x,y) is computed, the luminance on the retina, $dl_{ret}$, is obtained from the equation $$dc_{sat}(x,y) = w_2(x,y) \cdot dl_{ret}(x,y)$$

From $dl_{ret}$, the tolerable error level ds(x,y) for the pixel p(x,y) is computed from $$dl_{ret}(x,y) = w_1(x,y) \cdot ds(x,y)$$

The weights $w_1(x,y)$ and $w_2(x,y)$ are based on Girod's model. The masking model predicts that changes to pixel p(x,y) less than ds(x,y) introduce no perceptible distortion.

As have been described, steps 10, 11, 12 and 14 of FIG. 1 provide an overview of the video watermarking process. An overview of the scene-based video watermarking process is now described.

Overview of the Scene-Based Video Watermarking Process

Figure 2:
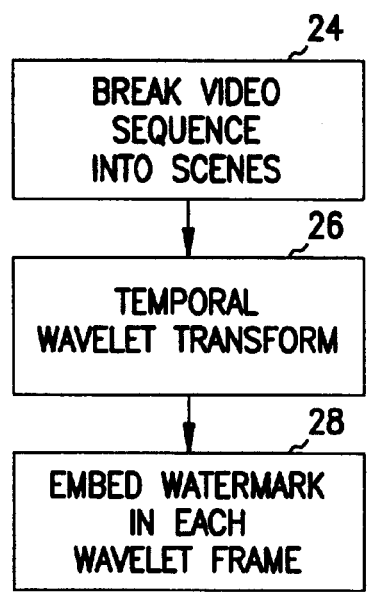
FIG. 2 is a flowchart of a method of an object-based video watermarking process.

Referring to FIG. 2, a flowchart of a method of a scene-based video watermarking process is shown. The method utilizes the watermarking method of FIG. 1 already described. In step 24, a video sequence (i.e., the host video data) is broken (segmented) into scenes, as known within the art. For example, the reference J. Nam and A. H. Tewfik, "Combined Audio and Visual Streams Analysis for Video Sequence Segmentation," in Proceedings of the 1997 International Conference on Acoustics, Speech and Signal Processing, (Munich, Germany), pp. 2665-2668 (April 1997), which is hereby incorporated by reference, describes such scene segmentation. Segmentation into scenes allows the watermarking procedures to take into account temporal redundancy. Visually similar regions in the video sequence, e.g., frames from the same scene, must be embedded with a consistent watermark. The invention is not limited to a particular segmentation into scenes algorithm, however.

In step 26, a temporal wavelet transform is applied on the video scenes, as has been previously described. That is, each scene comprises a number of frames, such that a temporal wavelet transform is applied to each frame within a scene. The resulting frames are known as wavelet frames. The multiresolution nature of the wavelet transform allows the watermark to exist across multiple temporal scales, resolving pirate attacks. For example, the embedded watermark in the lowest frequency (DC) wavelet frame exists in all frames in the scene.

In step 28, a watermark is embedded in each wavelet frame. The watermark is designed and embedded in the wavelet domain, such that the individual watermarks for each wavelet frame are spread out to varying levels of support in the temporal domain. For example, watermarks embedded in highpass wavelet frames are localized temporally. Conversely, watermarks embedded in lowpass wavelet frames are generally located throughout the scene in the temporal domain. The watermarks are embedded in accordance with perceptual and non-frequency masks, as has been described. That is, the watermarks are embedded in each frame of each scene in accordance with perceptual and spatial (non-frequency) characteristics of the frame, as has been described in conjunction with the method of FIG. 1.

The scene-based video watermarking method has several other advantages. It is scene-based and video dependent, and directly exploits spatial masking, frequency masking, and temporal properties such that the embedded watermark is invisible and robust. The watermark consists of static and dynamic temporal components that are generated from a temporal wavelet transform of the video scenes. The resulting wavelet frames are modified by a perceptually shaped pseudo-random sequence representing the author (owner). The noise-like watermark is statistically undetectable to thwart unauthorized removal. Furthermore, the author representation resolves the deadlock problem. The multiresolution watermark may be detected on single frames without knowledge of the location of the frames in the video scene.

Because the video watermarking procedure is perception-based, the watermark adapts to each individual video signal. In particular, the temporal and frequency distributions of the watermark are controlled by the masking characteristics of the host video signal. As a result, the strength of the watermark increases and decreases with host, e.g., higher amplitude in regions of the video with more textures, edges, and motion. This ensures that the embedded watermark is invisible while having the maximum possible robustness.

Because the watermark representation is scene-based and multiscale, given one or more frames from a potentially pirated video, the watermark may be extracted from the frames without knowledge of the location of the frame being tested. This detection characteristic exists due to the combined static and dynamic representation of the watermark.

The watermark representation provides an author representation that solves the deadlock problem. The author or owner of the video is represented with a pseudo-random sequence created by a pseudo-random generator and two keys. One key is author dependent, while the second key is signal dependent. The representation is able to resolve rightful ownership in the face of multiple ownership claims.

The watermark representation also provides a dual watermark. The watermarking scheme uses the original video signal to detect the presence of a watermark. The procedure can handle virtually all types of distortions, including cropping, temporal resealing, frame dropping, etc., using a generalized likelihood ratio test. This procedure is integrated with a second watermark which does not require the original signal to address the deadlock problem.

As have been described, steps 24, 26, and 28 of FIG. 2 provide an overview of a scene-based watermarking process. The specifics of the hardware implementation of the invention are now provided.

Hardware Implementation of the Invention

Figure 3:
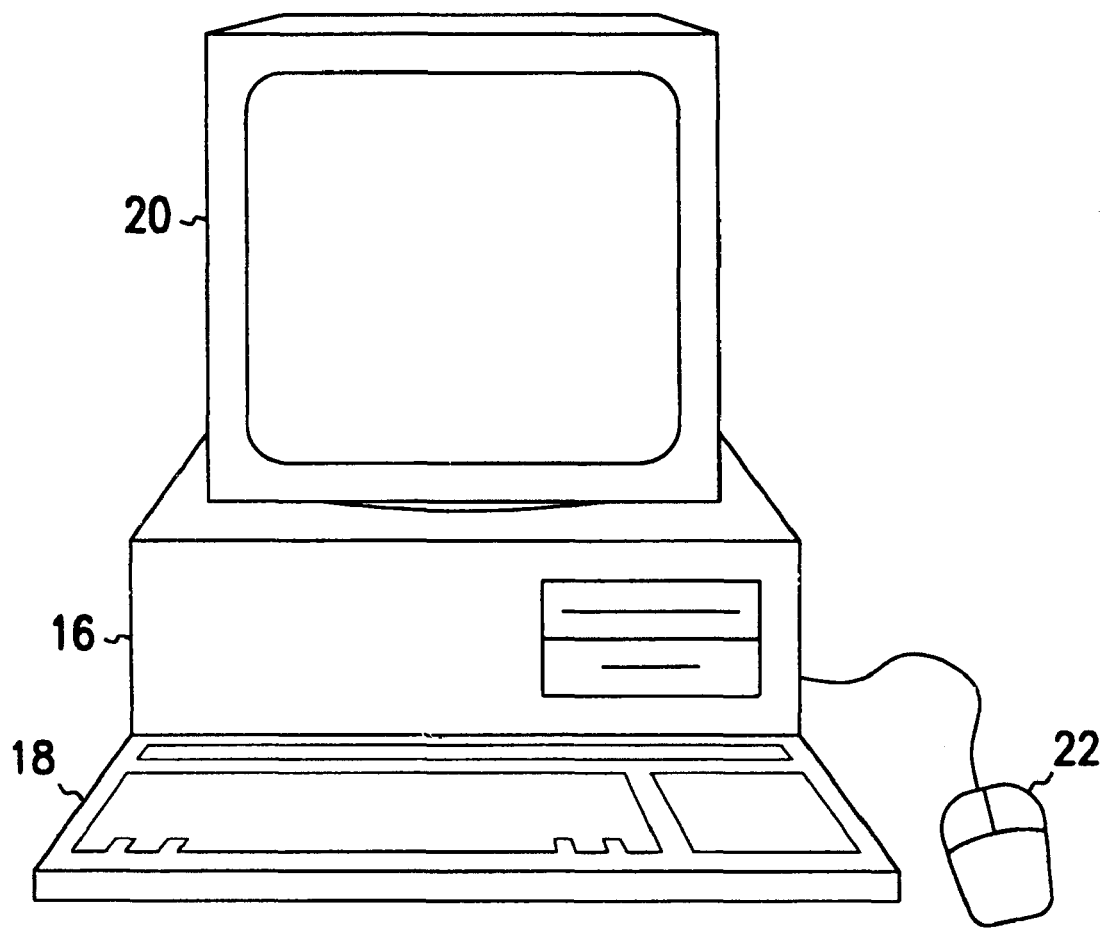
FIG. 3 is a diagram of a typical computer to be used with embodiments of the invention.

The invention is not limited as to the type of computer on which it runs. However, a typical example of such a computer is shown in FIG. 3. Computer 16 is a desktop computer, and may be of any type, including a PC-compatible computer, an Apple Macintosh computer, a UNIX-compatible computer, etc. Computer 16 usually includes keyboard 18, display device 20 and pointing device 22. Display device 20 can be any of a number of different devices, including a cathode-ray tube (CRT), etc. Pointing device 22 as shown in FIG. 3 is a mouse, but the invention is not so limited. Not shown is that computer 16 typically also comprises a random-access memory (RAM), a read-only memory (ROM), a central-processing unit (CPU), a fixed storage device such as a hard disk drive, and a removable storage device such as a floppy disk drive. The computer program to implement the invention is typically written in a language such as C, although the invention is not so limited.

The specifics of the hardware implementation have been described. A particular implementation of the scene-based video watermarking based on the methods of FIG. 1 and FIG. 2, is now described.

Particular Implementation of Scene-Based Video Watermarking

Figure 4:
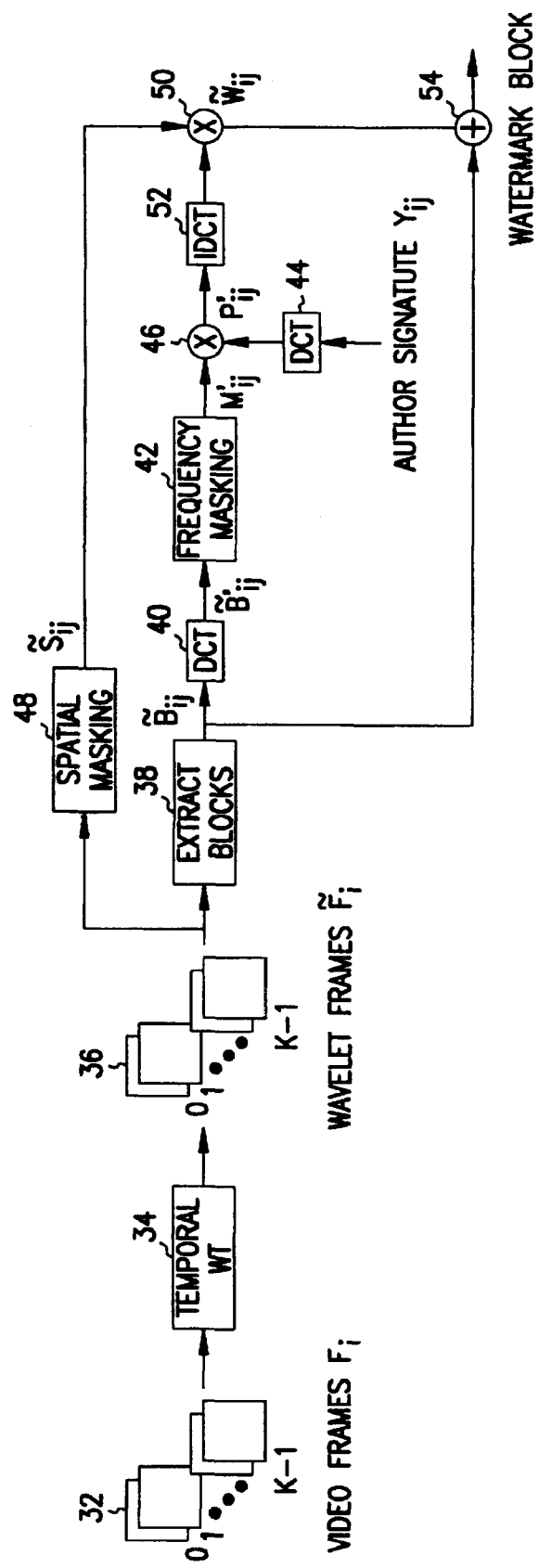
FIG. 4 is a block diagram of a specific implementation of scene-based video watermarking, based on the methods of FIG. 1 and FIG. 2.

The embodiment shown in FIG. 4 illustrates a particular implementation of scene-based video watermarking, as based on the methods of FIG. 1 and FIG. 2 that have already been described. Referring now to FIG. 4, a block diagram of this specific implementation of scene-based video watermarking is shown. Video frames 32 (of video host data) are denoted such that $F_i$ is the ith frame in a video scene, where i=0, ..., k−1. Frames are ordered sequentially according to time. Each frame is of size n.times.m. The video itself may be gray scale (8 bits/pixel) or color (24 bits/pixel). Frames 32 undergo a temporal wavelet transformation 34, as has been described, to become wavelet frames 36. The tilde representation is used to denote a wavelet representation. For example, $\tilde{F}_i$ is the ith wavelet coefficient frame. Without loss of generality, wavelet frames are ordered from lowest frequency to highest frequency—i.e., $\tilde{F}_0$ is a DC frame. Thus, there are k wavelet coefficient frames $\tilde{F}_i$, i=0, ..., k−1.

In step 38, each wavelet frame $\tilde{F}_i$ is segmented into 8.times.8 blocks $B_{ij}$, i=0, 1, ..., (n/8) and j=0, 1, ..., (m/8). In step 40, each block $B_{ij}$ is subjected to a discrete cosine transform (DCT), to become block $B_{ij}'$. In step 42, a perceptual frequency mask, as has been described, is applied to each block to obtain the frequency mask $M'_{ij}$. In step 44, author signature $Y_{ij}$—the watermark—also undergoes a discrete cosine transform to become $Y'_{ij}$. It should be noted that the generation of author signature $Y_{ij}$ is desirably in accordance with the process that has been described in conjunction with step 10 of FIG. 1, but the invention is not so limited.

In step 46, the mask $M'_{ij}$ is used to weight the noise-like author $Y'_{ij}$ for that frame block, creating the frequency-shaped author signature $P'_{ij}=M'_{ij}Y'_{ij}$. In step 48, the spatial mask $S_{ij}$ is generated, as has been described, and in step 50, the wavelet coefficient watermark block $W_{ij}$ is obtained by computing the inverse DCT of $P'_{ij}$ in step 52 and locally increasing the watermark to the maximum tolerable error level provided by the spatial mask $S_{ij}$. Finally, in step 54, the watermark $W_{ij}$ is added to the block B.about.ij, creating the watermarked block. The process is repeated for each wavelet coefficient frame F.about.i.

The watermark for each wavelet coefficient frame is the block concatenation of all the watermark blocks for that frame. The wavelet coefficient frames with the embedded watermarks are then converted back to the temporal domain using the inverse wavelet transform. As the watermark is designed and embedded in the wavelet domain, the individual watermarks for each wavelet coefficient frame are spread out to varying levels of support in the temporal domain. For example, watermarks embedded in highpass wavelet frames are localized temporally. Conversely, watermarks embedded in lowpass wavelet frames are generally located throughout the scene in the temporal domain.

The watermarks embedded within the video data according to the method of FIG. 4 should be extractable even if common signal processing operations are applied to the host data. This is particularly true in the case of deliberate unauthorized attempts to remove the watermark. For example, a pirate may attempt to add noise, filter, code, re-scale, etc., the host data in an attempt to destroy the watermark. The embedded watermark, however, is noise-like and its location over multiplied blocks of the host data, over successive frames of the data, is unknown. Therefore, the pirate has insufficient knowledge to directly remove the watermark. Furthermore, a different signature is used for each block to further reduce unauthorized watermark removal by cross correlation. Any destruction attempts are done blindly.

Detection of the watermark is accomplished via generalized likelihood ratio test. Two methods have been developed to extract the potential watermark from a test video or test video frame. Both employ hypothesis testing. One test employs index knowledge during detection, i.e., the placement of the test video frame(s) relative to the original video is known. The second detection method does not require knowledge of the location of the test frame(s). This is extremely useful in a video setting, where 1000's of frames may be similar, and it is uncertain where the test frames reside.

In the first method, watermark detection with index knowledge, when the location of the test frame is known, a straightforward hypothesis test may applied. For each frame in the test video Rk, a hypothesis test is performed.

H0: Xk=Rk−Fk=Nk (no watermark)
H1: Xk=Rk−Fk=W*k+Nk (watermark)
where Fk is the original frame, W*k is the (potentially modified) watermark recovered from the frame, and Nk is noise. The hypothesis decision is obtained by computing the scalar similarity between each extracted signal and original watermark Wk: Sk=Simk(Xk, Wk)=(Xk*Wk)/(Wk*Wk). The overall similarity between the extracted and original watermark is computed as the mean of Sk for all k: S=mean(Sk). The overall similarity is compared with a threshold to determine whether the test video is watermarked. The experimental threshold is desirably chosen around 0.1, i.e., a similarity value >=0.1 indicates the presence of the owner's copyright. In such a case, the video is deemed the property of the author, and a copyright claim is valid. A similarity value <0.1 indicates the absence of a watermark.

When the length (in terms of frames) of the test video is the same as the length of the original video, the hypothesis test is performed in the wavelet domain. A temporal wavelet transform of the test video is computed to obtain its wavelet coefficient frames R.about.k. Thus, H0: X.about.k=R.about.k−F.about.k=Nk (no watermark)
H1: X.about.k=R.about.k−F.about.k=W.about.*k+Nk (watermark)

where F.about.k are the wavelet coefficient frames from the original video, W.about.*k is the potentially modified watermarks from each frame, and Nk is noise. This test is performed for each wavelet frame to obtain X.about.k for all k. Similarity values are computed as before, Sk=Simk (X.about.k, W.about.k).

Using the original video signal to detect the presence of a watermark, virtually all types of distortions can be handled, including cropping, rotation, resealing, etc., by employing a generalized likelihood ratio test. A second detection scheme which is capable of recovering a watermark after many distortions without a generalized likelihood ratio test has also been developed. The procedure is fast and simple, particularly when confronted with the large amount of data associated with video.

In the method for watermark detection without index knowledge, there is no knowledge of the indices of the test frames. Pirate tampering may lead to many types of derived videos which are often difficult to process. For example, a pirate may steal one frame from a video. A pirate may also create a video which is not the same length as the original video. Temporal cropping, frame dropping, and frame interpolation are all examples. A pirate may also swap the order of the frames. Most of the better watermarking schemes currently available use different watermarks for different images. As such, they generally require knowledge of which frame was stolen. If they are unable to ascertain which frame was stolen, they are unable to determine which watermark was used.

This method can extract the watermark without knowledge of where a frame belongs in the video sequence. No information regarding cropping, frame order, interpolated frames, etc., is required. As a result, no searching and correlation computations are required to locate the test frame index. The hypothesis test is formed by removing the low temporal wavelet frame from the test frame and computing the similarity with the watermark for the low temporal wavelet frame. The hypothesis test is formed as H0: Xk=Rk−F.about.0=Nk (no watermark)
H1: Xk=Rk−F.about.0=W.about.*k+Nk (watermark)
where Rk is the test frame in the spatial domain and F.about.0 is the lowest temporal wavelet frame. The hypothesis decision is made by computing the scalar similarity between each extracted signal Xk and original watermark for the low temporal wavelet frame W.about.0: Simk(Xk, W.about.0). This simple yet powerful approach exploits the wavelet property of varying temporal support.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

The invention claimed is:

1. A method of embedding data in video, the method comprising:
    performing a temporal analysis of video to produce temporal components of the video;
    providing watermark data;
    adapting the watermark data to the temporal components; and
    embedding the adapted watermark signal into the video signal.

2. The method of claim 1 wherein the embedding comprises:

embedding the watermark data in the temporal components to produce watermarked temporal components.

3. The method of claim 2 wherein the temporal analysis comprises a temporal wavelet transform.

4. The method of claim 1 wherein the temporal components include a video components at plural different temporal scales.

5. The method of claim 1 wherein the temporal components represent changes in the video over time, the watermark data being embedded in the temporal components representing changes in the video over time.

6. The method of claim 1 wherein a first of the temporal components represents local changes in video while a second of the temporal component represents video features that remain relatively unchanged over time.

7. A method of embedding data in video, the method comprising:
transforming video into plural levels of temporal resolution;
providing watermark signals for separately embedding data in the plural levels of temporal resolution;
adapting the watermark signals to corresponding video at the plural levels of temporal resolution; and
embedding the adapted watermark signals in the corresponding video at the plural levels of temporal resolution.

8. A method of detecting data embedded in video, the method comprising:
receiving video frames with data embedded into a temporal domain representation of the video frames, the temporal domain representation comprising changes of the video signal in the video frame over time;
extracting a temporal component from plural of the video frames corresponding to the temporal domain representation; and
detecting a watermark in the temporal component.

9. The method of claim 8 including combining video frames and using the combined video frames to detect a first watermark at a low temporal resolution.

10. A method of detecting data embedded in video, the method comprising:
receiving video frames with data embedded into video signals of the video frames that is computed from a temporal analysis of the video signals;
combining the video frames to compute a temporal component of the video frames; and
detecting a watermark in the temporal component.

11. A computer readable, non-transitory medium, on which is stored instructions, which, when executed by a computer, perform a method of embedding data in video, the method comprising:
performing a temporal analysis of video to produce temporal components of the video;
providing watermark data;
adapting the watermark data to the temporal components; and
embedding the adapted watermark signal into the video signal.

12. The computer readable medium of claim 11 wherein the embedding comprises:
embedding the watermark data in the temporal components to produce watermarked temporal components.

13. The computer readable medium of claim 12 wherein the temporal analysis comprises a temporal wavelet transform.

14. The computer readable medium of claim 11 wherein the temporal components include a video components at plural different temporal scales.

15. The computer readable medium of claim 11 wherein the temporal components represent changes in the video over time, the watermark data being embedded in the temporal components representing changes in the video over time.

16. The computer readable medium of claim 11 wherein a first of the temporal components represents local changes in video while a second of the temporal component represents video features that remain relatively unchanged over time.

17. A computer readable, non-transitory medium, on which is stored instructions, which, when executed by a computer, perform a method of embedding data in video, the method comprising:
transforming video into plural levels of temporal resolution;
providing watermark signals for separately embedding data in the plural levels of temporal resolution;
adapting the watermark signals to corresponding video at the plural levels of temporal resolution; and
embedding the adapted watermark signals in the corresponding video at the plural levels of temporal resolution.

18. A computer readable, non-transitory medium, on which is stored instructions, which, when executed by a computer, perform a method of detecting data embedded in video, the method comprising:
receiving video frames with data embedded into a temporal domain representation of the video frames, the temporal domain representation comprising changes of the video signal in the video frame over time;
extracting a temporal component from plural of the video frames corresponding to the temporal domain representation; and
detecting a watermark in the temporal component.

19. The computer readable medium of claim 18, wherein the method performed by the instructions includes combining video frames and using the combined video frames to detect a first watermark at a low temporal resolution.

20. A computer readable, non-transitory medium, on which is stored instructions, which, when executed by a computer, perform a method of detecting data embedded in video, the method comprising:
receiving video frames with data embedded into video signals of the video frames that is computed from a temporal analysis of the video signals;
combining the video frames to compute a temporal component of the video frames; and
detecting a watermark in the temporal component.

* * * * *